Sept. 29, 1936.   E. S. DENNISON   2,055,814
COMBUSTION CHAMBER
Filed Oct. 9, 1934   3 Sheets-Sheet 1

INVENTOR
EDWARD S. DENNISON.
BY
A. B. Reavis
ATTORNEY

Sept. 29, 1936.  E. S. DENNISON  2,055,814
COMBUSTION CHAMBER
Filed Oct. 9, 1934  3 Sheets-Sheet 2

WITNESSES:
James K. Mosser
E. Lutz

INVENTOR
EDWARD S. DENNISON
BY
a. B. Reavis
ATTORNEY

Sept. 29, 1936.  E. S. DENNISON  2,055,814
COMBUSTION CHAMBER
Filed Oct. 9, 1934  3 Sheets-Sheet 3
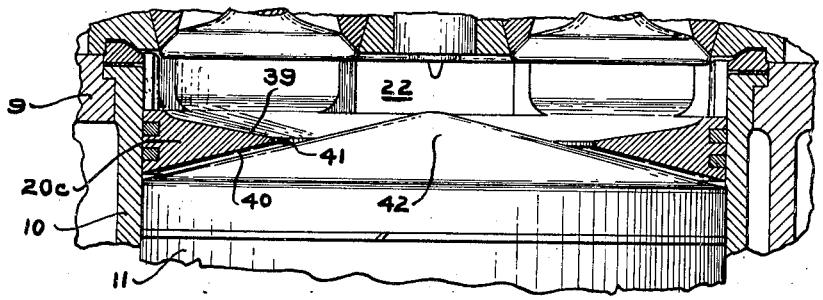
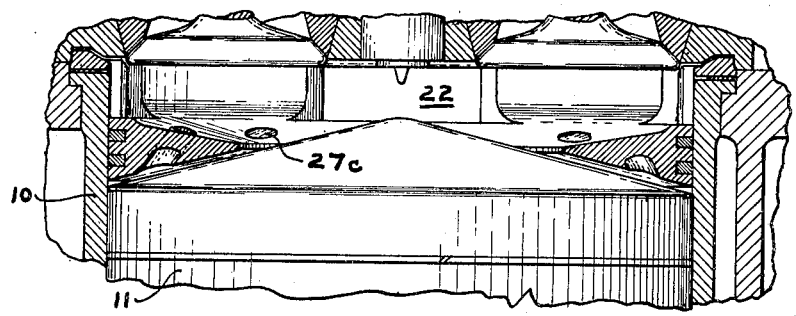
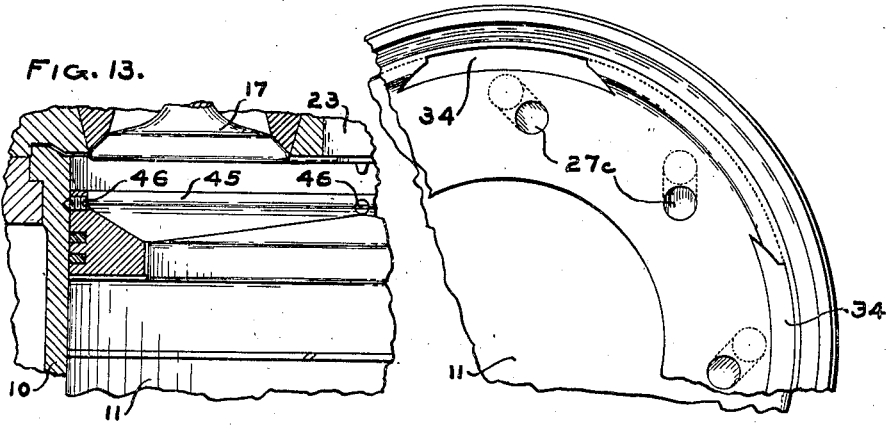
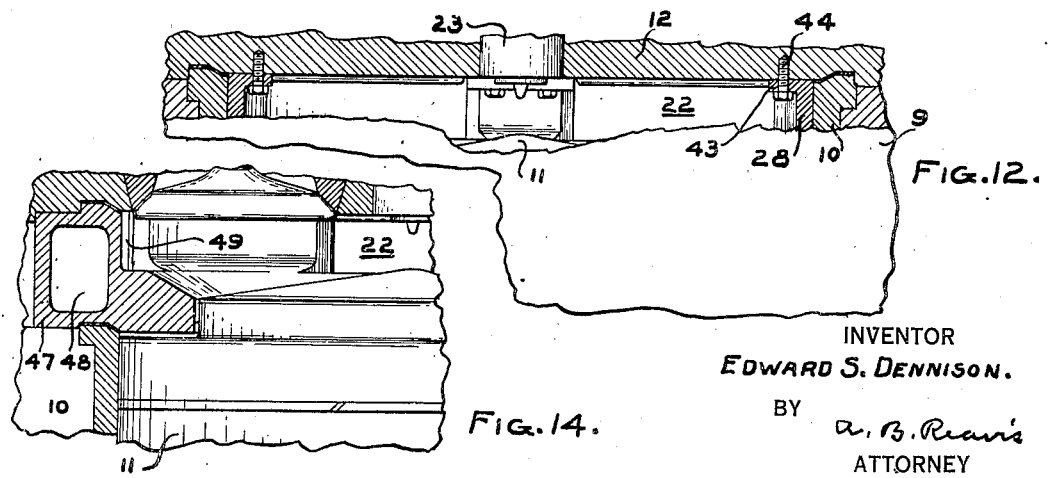
INVENTOR
EDWARD S. DENNISON.
BY
ATTORNEY Patented Sept. 29, 1936.

2,055,814

UNITED STATES PATENT OFFICE 2,055,814

COMBUSTION CHAMBER

Edward S. Dennison, Swarthmore, Pa., assignor to Westinghouse Electric & Manufacturing Company, East Pittsburgh, Pa., a corporation of Pennsylvania Application October 9, 1934, Serial No. 747,506

6 Claims. (Cl. 123—32)

My invention relates to internal combustion engines of the fuel injection type and it has for an object to effect turbulence of the compressed air charge so that combustion may be improved.

Various ways have heretofore been proposed to secure turbulence in internal combustion engines. In engines of the type supplied with an explosive mixture, means have been proposed to provide turbulence of the mixture to overcome stratification and to improve flame propagation. On the other hand, the problem is different with a Diesel engine of the solid-injection type, for, with the latter type, the fuel is injected under high pressure into the compressed air charge, the energy of the large pressure drop across the injection orifice being used in securing the desired penetration of the jet and disruption of the liquid into very fine particles, that is, atomization, the latter result being accompanied by enlargement of the cross section of the stream away from the orifice somewhat like a long gas flame. While such an atomizing jet secures mixing of fine fuel particles with the air, obviously conditions are such that the mixing is not uniform and complete, in consequence of which combustion may be imperfect because of deficiency of air in immediate contact with some of the fuel particles. This difficulty is more acute where there are combustion space limitations or the engine is operated at variable and high speeds and loads. Accordingly, the problem is to add to the energy causing partial admixture of the fuel particles and air in order that the fuel and air charges may be more completely mixed to secure substantially perfect combustion and, therefore, better utilization of the media supporting combustion; and the additional energy for this purpose is provided by creating a turbulent condition of the air charge incident to compression thereof, turbulence of the air being effective to increase the admixture of the fuel therewith, that is, sufficient relative motion of the relatively small quantity of fuel with respect to the relatively larger quantity of air occurs that adequate air is in contact with all of the fuel particles to assure complete combustion thereof. Furthermore, with a Diesel engine, more severe physical conditions, such as operating stresses, pressures and temperatures are encountered, and the solution of the problem of giving turbulence to the air charge should be done mechanically in such a way as to facilitate manufacture and maintenance and not to sacrifice the design of the engine in meeting the aforesaid physical conditions to the best advantage. Accordingly, it is an object of my invention to build an engine of the Diesel type which is possessed of standard and desired features of conventional design which have proved to be practically most satisfactory, such as a frame having insertable liners or cylinders with a head carried by the frame and closing the upper ends of the liners or cylinders and particularly a liner or cylinder of uniform bore and having a minimum amount of structural modification.

Turbulence of the air charge is secured by a turbulence ring which extends radially inward from the cylinder bore and is spaced from the inner face of the head a sufficient distance to provide, with the piston in upper dead center position, a combustion space, turbulence of the charge compressed into such space being secured by cooperative action of the ring and the piston during the latter portion of the compression stroke.

A further object of my invention is to provide an engine cylinder having a turbulence ring formed separately from the cylinder and the head and held in place by either or both of the latter parts.

A further object of my invention is to provide an engine cylinder having a turbulence ring in the upper portion thereof together with means effective as the piston nears the end of the compression stroke to increase the turbulent condition of the air charge.

A further object of my invention is to provide a Diesel engine wherein the head, a ring member, and the piston cooperate to provide a combustion chamber, the ring and the piston cooperating to effect turbulence of the air charge in the chamber, together with an atomizer for discharging one or more jets into the combustion chamber, the surfaces of the elements forming the combustion chamber being so shaped as to substantially avoid impingement of the jets thereon.

A further object of my invention is to provide a structure comprising a ring cooperating with the head and piston of a Diesel engine to form a combustion chamber into which the valves open, the structure being relieved to afford clearance both for movement of the valves and free gas flow thereabout.

These and other objects are effected by my invention, as will be apparent from the following description and claims, taken in accordance with the accompanying drawings, forming a part of this application, in which:

Figs. 9 and 10 show further modified forms of the turbulence ring;

Fig. 11 is a fragmentary plan view of the ring shown in Fig. 10;

Fig. 12 is a sectional detail view showing an alternative means for supporting the turbulence ring;

Fig. 13 is a sectional detail view showing further means for securing turbulence rings in place; and Fig. 14 is a detail view showing a turbulence ring modified to incorporate a cooling feature.

Figure 1:
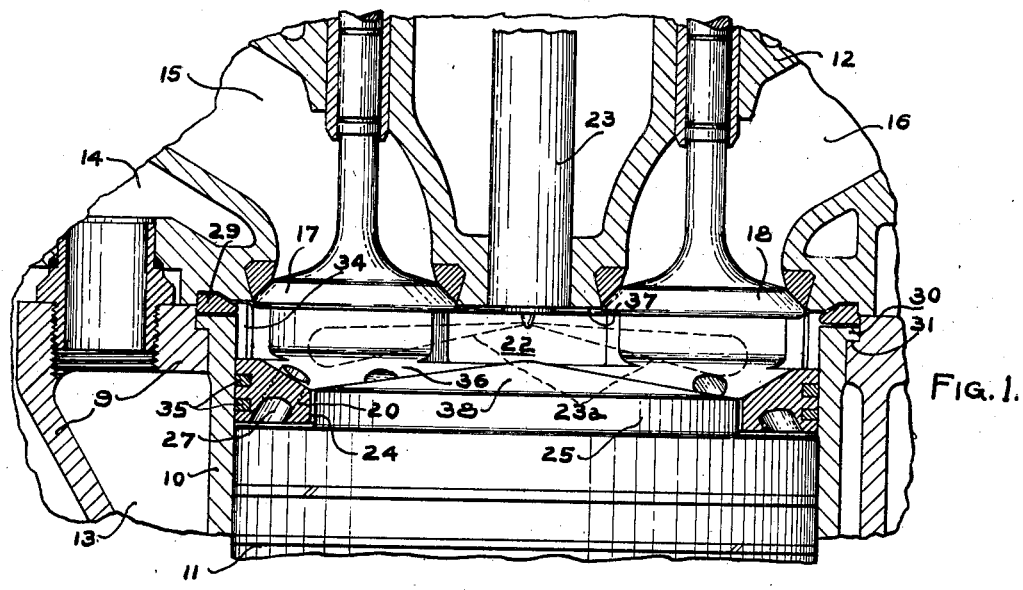
Fig. 1 is a sectional detail view of an engine cylinder incorporating my improvement.

Referring to Fig. 1, the engine frame 9 carries a cylinder or liner 10 having a piston 11 therein, the cylinder having its upper end closed by a head or cover 12 also carried by the frame. As usual, the cylinder or liner 10 and the head are provided with cooling jacket spaces 13 and 14 respectively.

Where the engine is of the four-cycle type, the head 12 is provided with inlet and exhaust passages 15 and 16 with which cooperate the inlet and exhaust valves 17 and 18, respectively. If the engine is of the high-speed type, it is desirable that maximum valve area be provided to facilitate the admission of air and exhaust of products of combustion, and this purpose has heretofore been achieved by the use of multiple valves, for example, two admission valves and two exhaust valves for each cylinder, as diagrammatically indicated in Fig. 2.

My invention relates to means used with the engine structure so far described to promote turbulence of the air charge. To this end, I show a liner 10 of uniform internal bore and structure at the upper portion thereof including a turbulence ring 20 spaced from the inner surface of the head or cover 12 and extending radially inward from the cylinder bore, the ring cooperating with the head and with the piston to provide a combustion chamber, at 22. As hereinafter pointed out, the piston and the ring have portions which cooperate to effect turbulence of the air charge compressed into the combustion chamber.

An atomizer 23 is carried by the head 12 and it is arranged to discharge one or more jets, diagrammatically indicated at 23a in Fig. 1, into the turbulent air charge in the combustion chamber, at 22, turbulence causing dispersion of the atomized fuel and thorough admixture thereof with the air. The atomizer 23 is supplied with liquid fuel under high pressure in accordance with usual solid injection practice, the high pressure of the liquid fuel being depended upon to secure atomization thereof as a result of passage of oil, with drop in pressure, through relatively small orifices. The combustion chamber, at 22, has the surfaces thereof so formed that impingement of the jets thereon is minimized.

The turbulence ring 20 and the piston 11 have portions thereof which cooperate to effect turbulence of the air charge compressed into the combustion chamber, at 22, through the throat or constriction 24 provided by the ring. The features responsible for turbulence may be embodied in a number of ways. The surfaces of the ring and the piston may be constructed and arranged to serve this purpose, or spiral passages may be provided either in the ring or in the piston to give a swirling effect to the air.

As shown in Fig. 1, the piston 11 is provided with a cylindrical extension 25 of smaller radius than the bore of the constriction or throat 24, whereby, during the final portion of the compression stroke, an annular orifice is provided which causes air to be discharged into the combustion chamber in an annular stream which is deflected by the head producing a highly turbulent condition of the air charge in the combustion chamber, at 22.

If desired, turbulence in the combustion chamber, at 22, may be further promoted by providing passages 27 in the ring 20, the passages extending somewhat tangentially or spirally and inward radially from the bottom to the top of the ring, whereby whirling motion will be given to the air discharged into the combustion chamber.

Figure 4:
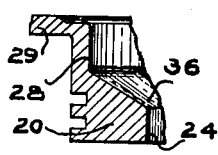
Fig. 4 is a sectional view taken along the line IV—IV of Fig. 2.
Figure 3:
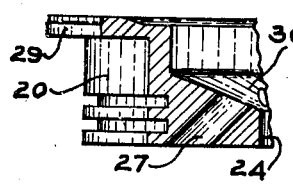

The structure comprising the turbulence or agitator ring 20 of Fig. 1 is preferably held in place between the upper end of the liner 10 and the cylinder cover 12. To this end, the structure includes an upper shell 28 fitting (see Fig. 4) the bore of the liner 10 and provided at its upper end with a flange 29, which overlaps and abuts the upper end of the liner 10, the latter preferably having a flange 30 fitting a counterbore 31 formed in the engine frame 9. The counterbore 31 is preferably of greater depth than the thickness of the flange 30 so that a socket remains for the reception of the flange 29. The flange 29 preferably extends above the top surface of the frame 9 and the head 12 is grooved to receive the flange. Thus, with connection of the head structure to the engine frame the liner will be clamped in place between the head and the frame and the turbulence ring flange will be clamped between the head and the upper end of the liner.

It is desirable to provide the head with maximum valve area and to provide for free gas flow about the valves. Accordingly, there are shown two admission valves 17 and two exhaust valves 18, the valves extending out near to the cylindrical boundary of the cylinder bore. Therefore, to avoid interference with inward movement of the valves and to provide for free flow of air and exhaust gases about the latter, the shell 28 is relieved or recessed, as indicated at 34.

A seal is preferably effected between the periphery of the ring 20 and the interior of the liner by means of piston rings 35, the latter also serving to conduct heat from the turbulence ring 20 to the liner, thereby avoiding overheating of the turbulence ring. From the structure described, it will be apparent that the cylinder head 12, the turbulence ring 20, and the piston cooperate so that surfaces thereof provide the combustion chamber, at 22, into which fuel is discharged by the atomizer 23. These parts are so shaped as to accommodate the fuel jets with minimum impingement of the jet or jets on the metallic surfaces forming the chamber. To this end, it is first of all necessary to space the turbulence ring from the inner face of the head or cover. Furthermore, the upper surface 36 of the ring 20 is dished or made concave so as to minimize the possibility of contact thereof with the jet or jets. As it is desirable to have as large a valve area as practicable, it will be apparent that the major portion of the inner surface of the cover is occupied by valves, leaving very little opportunity for modification of the head structure to provide the combustion chamber. Therefore, the head has a substantially flat inner surface 37 extending normally with respect to the cylinder axis. The piston preferably has a convex or conical portion 38 which extends through the throat 24 when it is in upper dead center position.

Therefore, it will be apparent that the surfaces 37, 36, and 38 of the cover, ring, and piston, respectively, provide a combustion chamber which is suitably shaped for the jets discharged by the atomizer, the space diverging radially from the atomizer to accommodate the jets while maintaining the required ratio of compression. In addition to the piston extension 25 and the conical portion 38 carried thereby functioning in this way, such extension, as already pointed out, brings about a condition of turbulence which starts just as soon as the cylindrical portion 25 of the extension begins to lap the lower edge of the cylindrical throat 24.

Figure 2:
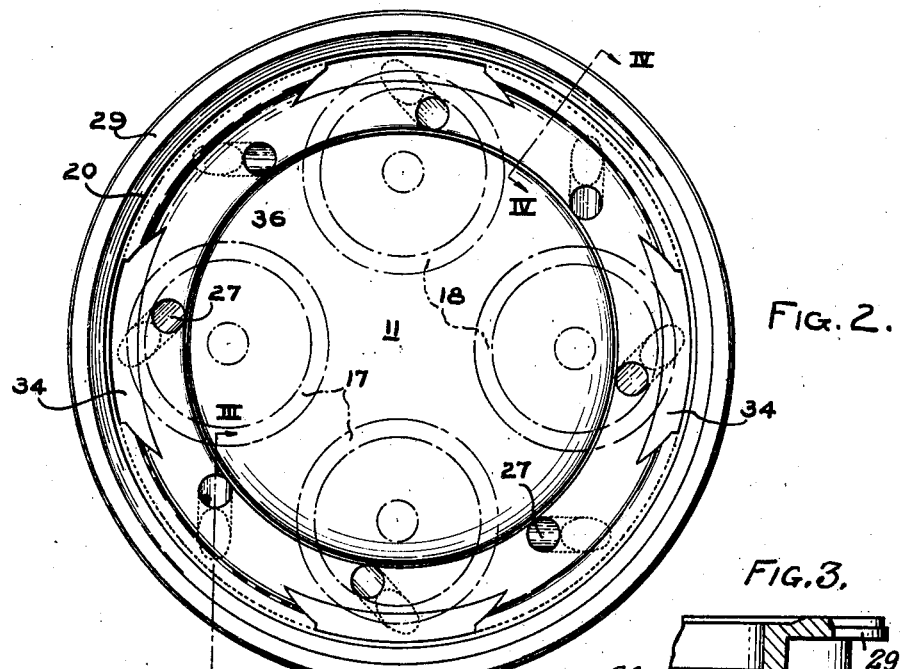
Fig. 2 is a top plan view of the turbulence ring of Fig. 1.
Figure 3:
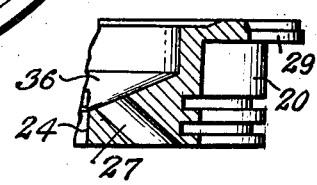
Fig. 3 is a sectional view taken along the line III—III of Fig. 2.

While inclined openings 27 are shown in Figs. 1, 2, and 3, the ring is effective for the purpose without such openings. Accordingly, in Figs. 9, 13, and 14, I show a ring which is similar to that shown in Fig. 1 except that the inclined openings 27 are omitted.

Figure 5:
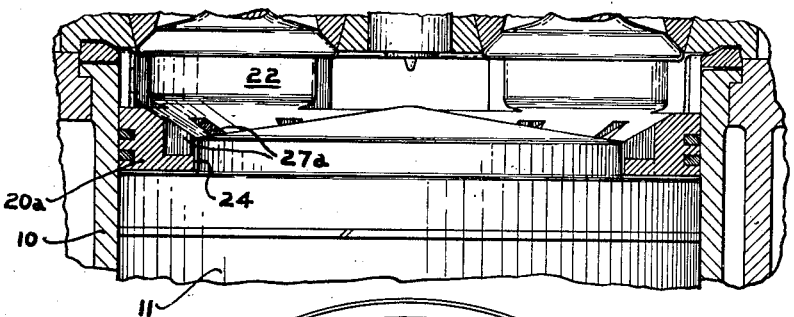
Fig. 5 is a view similar to Fig. 1 but showing a further modified form of turbulence ring.
Figure 6:
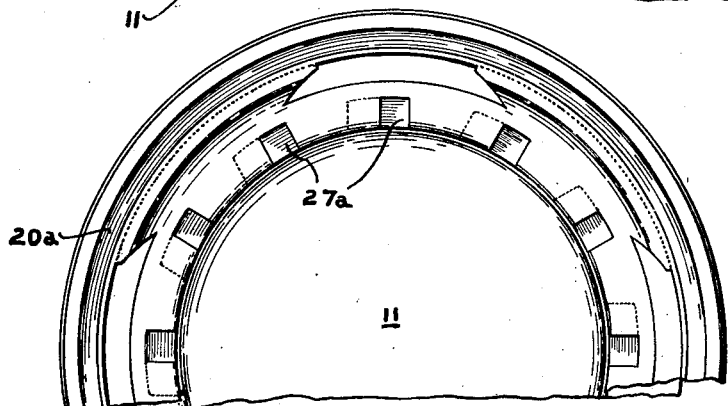
Fig. 6 is a detail plan view of the turbulence ring shown in Fig. 5.

In Figs. 5 and 6, I show a modified form of turbulence ring 20a wherein, instead of inclined openings 27, as shown in Figs. 1 to 3, inclusive, the ring is provided with inclined slots 27a serving the same purpose, the slots 27a opening into the throat 24 connecting the combustion chamber, at 22, with the portion of the cylinder at the remote side of the ring 20a.

Figure 7:
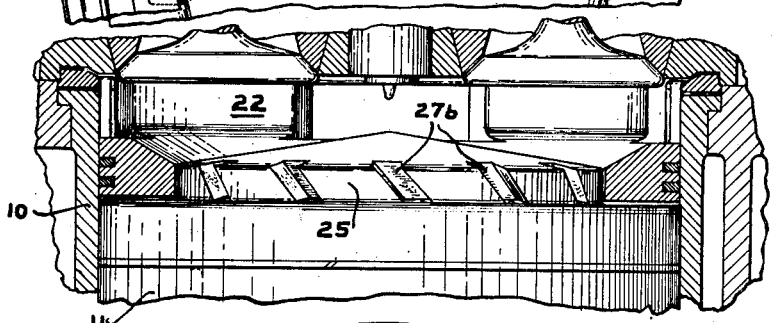
Fig. 7 shows a further embodiment of the turbulence ring.
Figure 8:
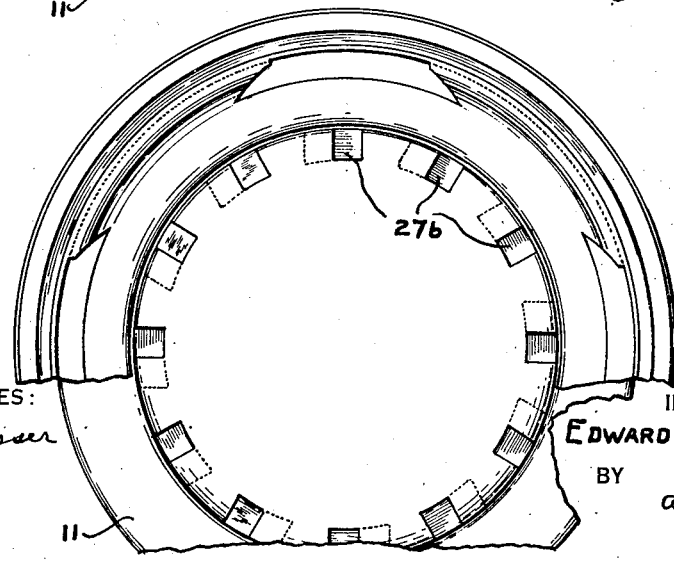
Fig. 8 is a detail plan view of the turbulence ring shown in Fig. 7.

In Figs. 7 and 8, I show a further modified means for securing whirling motion of air in the combustion chamber at 22, wherein the cylindrical extension 25 of the piston is provided with a circular series of inclined slots 27b.

In Fig. 9, I show a further modified form of turbulence ring 20c wherein the upper and lower sides 39 and 40 of the ring are dished or concaved, that is, such surfaces are preferably conical surfaces. The surfaces converge radially inward so that the ring defines a relatively shorter throat 41 than that heretofore described. As the lower surface 40 of the ring is substantially conical, it will be apparent that the piston top 42 may be made conical or convex so as to extend up through the throat when the piston is at upper dead center position. These features contribute to provide a combustion chamber of a shape suitable to the streams of injected fuel.

In the embodiment shown in Fig. 9, it will be apparent that turbulence also occurs as the piston approaches the end of the compression stroke, for air will be compressed and squeezed out into the combustion chamber 22 from between the surface 40 and that of the conical top of the piston, the out-flow velocity of such air into the combustion chamber producing a turbulent condition in the latter.

In Fig. 10 and Fig. 11, I show an embodiment which is similar to Fig. 9, except that inclined openings 27c are provided in the turbulence ring to assist in promoting a turbulent condition in the combustion chamber, as heretofore pointed out.

In Fig. 12, I show a modified arrangement for connecting the shell 28 of any of the forms of turbulence ring structures hereinbefore described in place, the shell having an inwardly projecting flange 43 connected by screws 44 to the cylinder head 12.

In Fig. 13, I show a further modified form wherein the turbulence ring structure is connected directly to the liner, the ring preferably having a flange 45 at its upper side connected by set screws 46 to the liner.

In Fig. 14, I show an embodiment of my invention wherein the structure providing the turbulence ring also includes a portion 47 defining a jacket 48 for cooling fluid so that the ring may be cooled, the structure being preferably relieved at 49 to afford clearance for the inwardly-opening valves.

From the foregoing, it will be apparent that I have provided, in connection with a Diesel engine having a cylinder or liner of uniform bore, a structure having a ring extending radially inward from the bore of the cylinder, the ring cooperating with the piston and the cylinder head to provide a turbulent combustion chamber. The piston cooperates with the ring to direct air at suitable velocities into the combustion chamber to produce such a state of turbulence therein as to secure dispersion of the injected fuel throughout the air charge to effect substantially complete combustion. A jet of atomized fuel, effected by applying liquid fuel under high pressure to a small orifice, penetrates into the combustion space, and some dispersion of the finely divided particles occurs as is indicated by enlargement of the jet in the direction away from the orifice through which injection takes place. It is desirable to shape the combustion chamber so that proper penetration may occur without impingement of the fuel particles on any of the metallic surfaces defining the chamber. Furthermore, in order that effective combustion may occur, it is desirable to bring the air charge into such relation to the jet as to promote the best mixture of the injected fuel and the air. Therefore, the turbulence ring structure and the piston are arranged to bring about turbulence of air in the combustion chamber, so that energy of the turbulent air is effective to disperse or mix the finely divided fuel particles with the air charge and throughout the latter, the fuel having been atomized and dispersed to some extent by the injection process. With mixture or distribution of the fuel particles throughout the air charge, complete combustion may be rapidly effected at high speeds and under variable load conditions.

While I have shown my invention in several forms, it will be obvious that it is not so limited, but is susceptible of various other changes and modifications without departing from the spirit thereof, and I desire, therefore, that only such limitations shall be placed thereupon as are specifically set forth in the appended claims, or as are imposed by the prior art.

What I claim is:
1. In an internal combustion engine of the four-cycle Diesel type, a cylinder, a head for the cylinder, a piston in the cylinder, a ring structure including annular anchor and turbulence portions, said anchor portion being held in place between the outer end of the cylinder and the head and the turbulence portion extending radially inward of the bore to provide an axially-extending throat, said piston having a top axial extension projecting through the throat when the piston is in upper dead center position and the extension being slightly smaller than the throat to provide an orifice directed toward the inner surface of the head, the inner surface of said head and the upper surfaces of the annular turbulence portion and of the piston extension defining a relatively flat combustion chamber disposed transversely of the cylinder axis, admission and exhaust valves carried by the head for admitting air to and for exhausting products of combustion from the combustion chamber, and atomizer means carried by the head for discharging an atomized spray of fuel radially of said chamber.

2. In an internal combustion engine of the four-cycle Diesel type; a cylinder; a head for the cylinder; a piston in the cylinder; a turbulence ring adjacent to the head, fitting interiorly of the bore of the cylinder, and extending radially inward of the bore of the cylinder to provide an axially-extending throat; said piston having a top axial extension projecting through the throat when in upper dead center position and the extension being slightly smaller than the throat to provide an annular orifice directed toward the inner surface of the head; the inner surface of said head and the upper surfaces of the ring and of the piston extension defining a relatively flat combustion chamber disposed transversely of the cylinder axis and which diverges radially outward; admission and exhaust valves carried by the head for admitting air to and for exhausting products of combustion from the combustion chamber; and atomizer means carried by the head for discharging an atomized spray of fuel radially outward into the combustion chamber and between the upper and lower divergent surfaces thereof.

3. In an internal combustion engine of the four-cycle Diesel type, a cylinder, a head for the cylinder, a piston in the cylinder, a ring structure including annular anchor and turbulence portions, said anchor portion being held in place between the outer end of the cylinder and the head and the turbulence portion extending radially inward of the bore of the cylinder to provide an axially-extending throat, said piston having a top axial extension projecting through the throat when in upper dead center position and the extension being slightly smaller than the throat to provide an axially-extending annular orifice, the inner surface of the head and the upper surfaces of the ring and of the piston extension defining a relatively flat combustion chamber disposed transversely of the cylinder, admission and exhaust valves carried by the head for admitting air to and for exhausting products of combustion from the combustion chamber, and atomizer means carried by the head for discharging an atomized spray of fuel radially of said combustion chamber, the top surface of said annular turbulence portion being concave and the top surface of said piston extension being convex in order that the combustion chamber may be shaped to conform to the spray in such manner as to minimize contact of fuel particles with the surfaces thereof.

4. In an internal combustion engine of the four-cycle Diesel type, a cylinder, a head for the cylinder, a piston in the cylinder, a ring structure including annular anchor and turbulence portions, said anchor portion being held in place between the outer end of the cylinder and the head and the turbulence portion extending radially inward of the bore to provide an axially-extending throat, said piston having a top axial extension projecting through the throat when in upper dead center position and the extension being slightly smaller than the throat to provide an axially-extending annular orifice, the inner surface of said head and the upper surfaces of the annular turbulence portion and of the piston extension defining a relatively flat combustion chamber disposed transversely of the cylinder axis, atomizer means carried by the head and having its discharge end arranged axially of the combustion chamber and providing for the discharge of atomized fuel radially of said chamber, and admission and exhaust valves carried by the head and opening inwardly into the combustion chamber, said anchor portion being relieved to provide for movement of the valves and for free flow of gases about the latter.

5. In an internal combustion engine of the four-cycle Diesel type, a cylinder; a head for the cylinder; a piston in the cylinder; a ring structure including annular anchor and turbulence portions, the turbulence portion fitting interiorly of the bore of the cylinder and the anchor portion including a flange part held in place between the outer end of the cylinder and the head and a sleeve part fitting interiorly of the bore of the cylinder and joining the flange part to the annular turbulence portion, and said annular turbulence portion extending radially inward of the bore to provide an axially-extending throat; said piston having a top axial extension extending through the throat when in upper dead center position and the extension being slightly smaller than the throat to provide an axially-extending annular orifice; the inner surface of said head and the upper surfaces of the annular turbulence portion of the piston extension defining a relatively flat combustion chamber disposed transversely of the cylinder axis; atomizer means carried by the head and extending axially into the combustion chamber and providing for the discharge of atomized fuel radially of said chamber; and a plurality of admission and exhaust valves carried by the head and of such sizes that they extend relatively close to the atomizer and to the bore of the cylinder and being so arranged as to open inwardly into the combustion chamber; said connecting sleeve part being relieved in the path of the movement of said valves to provide clearance for movement of the latter and for free gas flow thereabout.

6. In an internal combustion engine of the four-cycle Diesel type, a cylinder; a head for the cylinder; a piston in the cylinder; a ring structure including annular anchor and turbulence portions, the turbulence portion fitting interiorly of the bore of the cylinder and the anchor portion including a flange part held in place between the outer end of the cylinder and the head and a sleeve part fitting interiorly of the bore of the cylinder and joining the flange part to the annular turbulence portion, and said annular turbulence portion extending radially inward of the bore to provide an axially-extending throat; said piston having a top axial extension extending through the throat when in upper dead center position and the extension being slightly smaller than the throat to provide an axially-extending annular orifice; the inner surface of said head and the upper surfaces of the annular turbulence portion and of the piston extension defining a relatively flat combustion chamber disposed transversely of the cylinder axis; atomizer means carried by the head and extending axially into the combustion chamber and providing for the discharge of atomized fuel radially of said chamber; and a circular series of admission and exhaust valves carried by said head and disposed about the atomizer means and of such size that they extend relatively near to the atomizer means and to the bore of the cylinder; said connecting sleeve part being relieved in the path of the movement of said valves to provide clearance for movement of the latter and for free gas flow thereabout.

EDWARD S. DENNISON.